(12) United States Patent
Smith et al.

(10) Patent No.: US 11,907,720 B2
(45) Date of Patent: Feb. 20, 2024

(54) SAVING AND RESTORING REGISTERS

(71) Applicant: ARM LIMITED, Cambridge (GB)

(72) Inventors: Bradley John Smith, Cambridge (GB); Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/759,978

(22) PCT Filed: Nov. 26, 2020

(86) PCT No.: PCT/GB2020/053011
§ 371 (c)(1),
(2) Date: Aug. 2, 2022

(87) PCT Pub. No.: WO2021/156588
PCT Pub. Date: Aug. 12, 2021

(65) Prior Publication Data
US 2023/0069266 A1    Mar. 2, 2023

(30) Foreign Application Priority Data
Feb. 6, 2020    (GB) .................................... 2001641

(51) Int. Cl.
*G06F 9/30*    (2018.01)
(52) U.S. Cl.
CPC ........ *G06F 9/30123* (2013.01); *G06F 9/3013* (2013.01); *G06F 9/30043* (2013.01); *G06F 9/30112* (2013.01); *G06F 9/30189* (2013.01)

(58) Field of Classification Search
CPC ............. G06F 9/30123; G06F 9/30043; G06F 9/30112; G06F 9/3013; G06F 9/30189
See application file for complete search history.

(56) References Cited

U.S. PATENT DOCUMENTS 6,314,504 B1 * 11/2001 Dent ................... G06F 9/30192
711/212
6,314,513 B1    11/2001 Ross et al.
(Continued)

FOREIGN PATENT DOCUMENTS

WO    2019/180401 A1    9/2019

OTHER PUBLICATIONS

Robert N M Watson, et al., "Capability Hardware Enhanced RISC Instructions: CHERI Instruction-Set Architecture Version 6)", Apr. 30, 2017 (Apr. 30, 2017), XP055577448, Retrieved from the Internet: URL: https://www.cl.cam.ac.uk/techreports/UCAM-CL-TR-907.pdf [retrieved on Apr. 4, 2019] Chapter 6.

*Primary Examiner* — Corey S Faherty
(74) *Attorney, Agent, or Firm* — NIXON & VANDERHYE P.C.

(57) ABSTRACT

There is provided a data processing apparatus comprising a plurality of registers, each of the registers having data bits to store data and metadata bits to store metadata. Each of the registers is adapted to operate in a metadata mode in which the metadata bits and the data bits are valid, and a data mode in which the data bits are valid and the metadata bits are invalid. Mode bit storage circuitry indicates whether each of the registers is in the data mode or the metadata mode. Execution circuitry is responsive to a memory operation that is a store operation on one or more given registers.

20 Claims, 11 Drawing Sheets

(56) References Cited

U.S. PATENT DOCUMENTS

| | | | |
|---|---|---|---|
| 9,317,285 B2* | 4/2016 | Gupta | G06F 9/384 |
| 9,639,369 B2* | 5/2017 | Blasco | G06F 9/30112 |
| 11,226,821 B2* | 1/2022 | Godard | G06F 12/14 |
| 2005/0257092 A1* | 11/2005 | Alexander | G06F 11/263 |
| | | | 714/37 |
| 2011/0078389 A1* | 3/2011 | Patel | G06F 9/30105 |
| | | | 712/225 |
| 2011/0231633 A1* | 9/2011 | Grisenthwaite | G06F 9/3861 |
| | | | 712/E9.028 |
| 2012/0151189 A1* | 6/2012 | Kruecken | G06F 9/30105 |
| | | | 712/E9.023 |
| 2015/0006856 A1* | 1/2015 | Rash | G06F 9/30189 |
| | | | 712/208 |
| 2015/0205609 A1* | 7/2015 | Godard | G06F 9/30094 |
| | | | 712/225 |
| 2017/0139712 A1* | 5/2017 | Giles | G06F 15/8007 |

* cited by examiner

```
Outer () {
    CPUSH r4
    ⋮
    MOV r4, #4
    BL inner
    ⋮
    DIV r0, r4, r1
    ⋮
    CPOP r4
}
Inner () {
    CPUSH r6
    ⋮
    LD r6 [r1]
    ADD r0, r6, r1
    ⋮
    CPOP r6
}
```

FIG. 5

SAVING AND RESTORING REGISTERS

This invention was made with Government support under Contract Number HR001118C0016 awarded by the Defense Advanced Research Projects Agency (DARPA). The Government has certain rights in this invention.

The present technique relates to data processing.

There are a number of situations in which it might be desirable for registers in a data processing apparatus to store a variable number of valid bits. For instance, in one mode of operation, a register could store data and in another mode of operation, the register could store metadata in addition to the data. This can lead to problems when such registers are to be stored. In particular, if all the registers are treated as having only data validly stored then the metadata would be lost. Alternatively, if all of the registers are treated as having metadata validly stored, then this causes space to be wasted for those registers that have no metadata. One could provide one save mechanism for the registers with valid metadata and a second instruction for registers without valid metadata. But this requires two operations, which increases program length, the necessary size of the instruction set, and is less time efficient due to two operations having to be performed each time the registers are to be stored. Using two instructions may also not be practical as there may be cases where it may not be known at compile time if a register will store data and metadata, or just data. One such example is when the register state of a calling function needs to be saved by a callee function. Similar problems apply to the restoring of such registers.

Viewed from a first example configuration, there is provided a data processing apparatus comprising: a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid; mode bit storage circuitry adapted to indicate whether each of the registers is in the data mode or the metadata mode; and execution circuitry, responsive to a memory operation that is a store operation on one or more given registers: to determine from the mode bit storage circuitry whether a register in the one or more given registers is in the data mode or the metadata mode, to store the data bits of the register and the metadata bits of the register to a data structure in memory when the register is in the metadata mode, and to store the data bits of the register without the metadata bits of the register to the data structure in the memory when the register is in the data mode.

Viewed from a second example configuration, there is provided a data processing apparatus comprising: a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid; mode bit storage circuitry adapted to indicate whether each of the registers is in the data mode or the metadata mode; and execution circuitry, responsive to a memory operation that is a load operation on one or more given elements of a data structure in a memory: to determine whether an element in the one or more given elements is of a data type or a combined type, to load the element into the data bits of one of the registers and to set the mode bit storage circuitry to indicate that the one of the registers is in the data mode when the element is of the data type, and to load the element into the data bits and the metadata bits of one of the registers when the element is of the combined type.

Viewed from a third example configuration, there is provided a data processing method, comprising: indicating whether each of a plurality of registers is in a data mode or a metadata mode, wherein each of the registers has data bits to store data, and metadata bits to store metadata, and wherein when one of the registers operates in the metadata mode, the metadata bits and the data bits are valid, and when the one of the registers operates in the data mode, the data bits are valid and the metadata bits are invalid; responding to a memory operation that is a store operation by: determining from mode bit storage circuitry whether a register in the one or more given registers is in the data mode or the metadata mode; storing the data bits of the register and the metadata bits of the register to a data structure in memory when the register is in the metadata mode; and storing the data bits of the register without the metadata bits of the register to the data structure in the memory when the register is in the data mode.

Viewed from a fourth example configuration, there is provided a data processing method, comprising: indicating, using mode bit storage circuitry, whether each of a plurality of registers is in a data mode or a metadata mode, wherein each of the registers has data bits to store data, and metadata bits to store metadata, and wherein when one of the registers operates in the metadata mode, the metadata bits and the data bits are valid, and when the one of the registers operates in the data mode, the data bits are valid and the metadata bits are invalid; responding to a memory operation that is a load operation by: determining whether an element in the one or more given elements is of a data type or a combined type; loading the element into the data bits of one of the registers and setting the mode bit storage circuitry to indicate that the one of the registers is in the data mode when the element is of the data type; and loading the element into the data bits and the metadata bits of one of the registers when the element is of the combined type.

Viewed from a fifth configuration, there is provided a computer program for controlling a host data processing apparatus to provide an instruction execution environment comprising: a plurality of register data structures, each of the register data structures having data bit data structures to store data, and metadata data structures to store metadata, wherein each of the register data structures is adapted to operate in a metadata mode in which the metadata bit data structures and the data bit data structures are valid, and a data mode in which the data bit data structures are valid and the metadata bit data structures are invalid; a mode bit data structure adapted to indicate whether each of the register data structures is in the data mode or the metadata mode; and execution program logic, responsive to a memory operation that is a store operation on one or more given register data structures: to determine from the mode bit data structure whether a register data structure in the one or more given register data structures is in the data mode or the metadata mode, to store the data bit data structures of the register data structure and the metadata bit data structures of the register data structures to a memory data structure when the register data structure is in the metadata mode, and to store the data bit data structures of the register data structure without the metadata bit data structures of the register data structures to the memory data structure when the register is in the data mode.

Viewed from a sixth configuration, there is provided a computer program for controlling a host data processing apparatus to provide an instruction execution environment comprising: a plurality of register data structures, each of the register data structures having data bit data structures to store data, and metadata data structures to store metadata, wherein each of the register data structures is adapted to operate in a metadata mode in which the metadata bit data structures and the data bit data structures are valid, and a data mode in which the data bit data structures are valid and the metadata bit data structures are invalid; a mode bit data structure adapted to indicate whether each of the register data structures is in the data mode or the metadata mode; and execution program logic, responsive to a memory operation that is a load operation on one or more given elements of a memory data structure: to determine whether an element in the one or more given elements is of a data type or a combined type, to load the element into the data bit data structures of one of the register data structures and to set the mode bit storage data structure to indicate that the one of the register data structures is in the data mode when the element is of the data type, and to load the element into the data bit data structures and the metadata bit data structures of one of the register data structures when the element is of the combined type.

The present technique will be described further, by way of example only, with reference to embodiments thereof as illustrated in the accompanying drawings, in which:

FIG. 5 shows an example of a function call being made from an outer function to an inner function in accordance with some embodiments;

Figure 1:
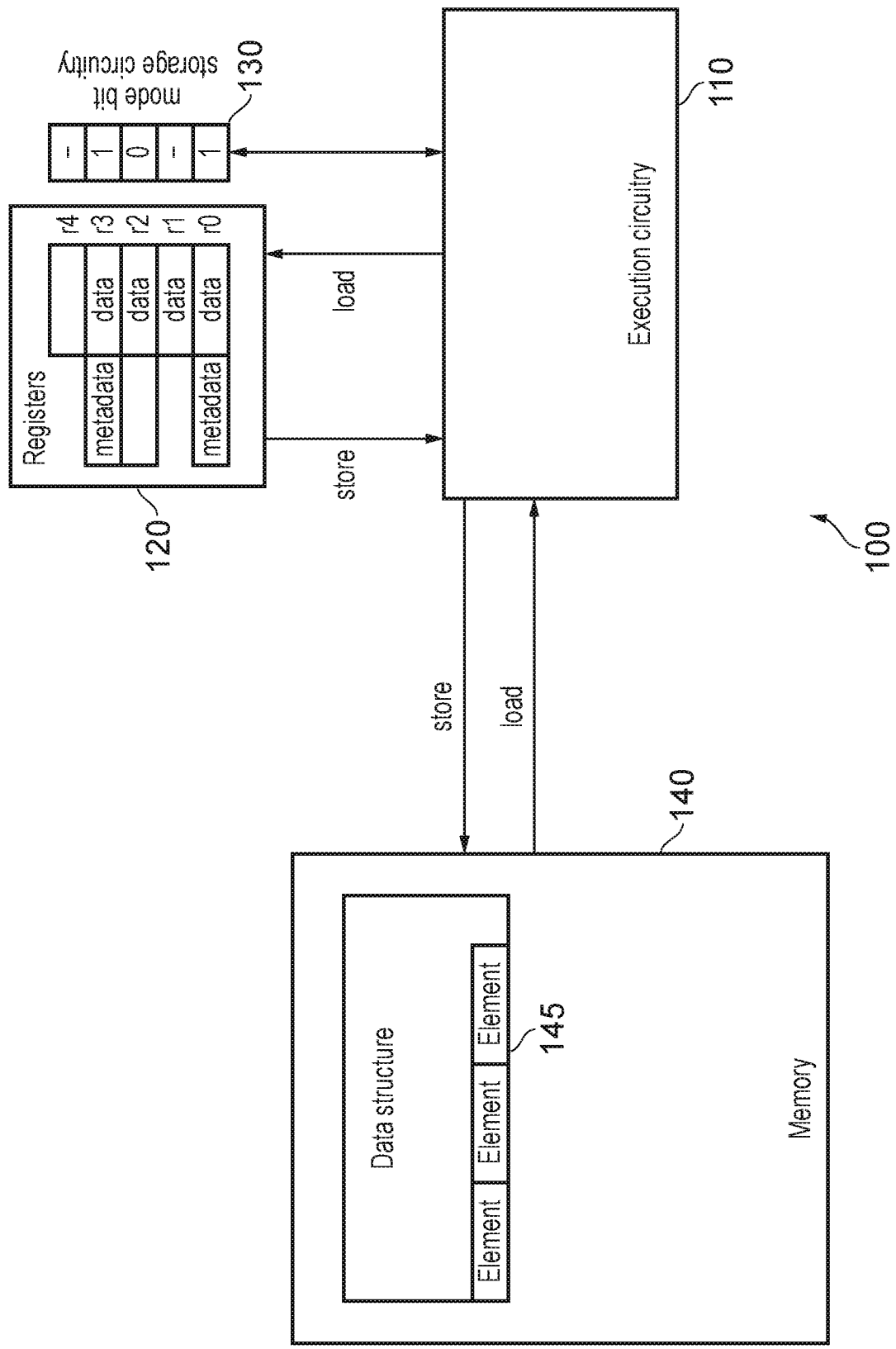
FIG. 1 illustrates a data processing system in accordance with some embodiments.

Before discussing the embodiments with reference to the accompanying figures, the following description of embodiments and associated advantages is provided.

In accordance with a first example configuration there is provided a data processing apparatus comprising: a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid; mode bit storage circuitry adapted to indicate whether each of the registers is in the data mode or the metadata mode; and execution circuitry, responsive to a memory operation that is a store operation on one or more given registers: to determine from the mode bit storage circuitry whether a register in the one or more given registers is in the data mode or the metadata mode, to store the data bits of the register and the metadata bits of the register to a data structure in memory when the register is in the metadata mode, and to store the data bits of the register without the metadata bits of the register to the data structure in the memory when the register is in the data mode.

In such systems, some of the registers can be capable of storing both data and metadata. The metadata could be associated with the data, for instance, and could represent a state of the data, access permissions for the data, or even a state of the register itself such as the time the data was last accessed. In these embodiments, although the registers are capable of storing both data and metadata, the register could operate in either a data mode in which the data is valid and the metadata is invalid, or a metadata mode in which the data and metadata are both valid. Note that the term 'validity' is used in acknowledgement of the fact that even though a register might technically be storing metadata (by virtue of the register always storing something), the metadata that is being stored is not useful. In these systems, mode bit storage circuitry can be used to indicate which of the modes (data or metadata) each of the registers currently operates in. By referencing the mode bit storage circuitry during a storage (access) operation, it is possible to store the valid bits of each of the registers without the invalid bits being stored. Consequently, bits (such as invalid metadata bits) are not unnecessarily stored to the data structure. Furthermore, this operation can be performed by a single operation rather than requiring one operation to store all of the registers that have only data and then another operation to store all of the registers that have data and metadata.

In some examples, the data bits and the metadata bits of the register that are stored in the data structure in response to the store operation are stored as a contiguous block in the data structure. The store operation causes the execution circuitry to store the data bit and the metadata bits as a single block of bits in the data structure of the memory. As a consequence, the data bits and the metadata bits can be more easily located than if these bits were fragmented and stored in multiple different locations of the data structure. Note that although the block is contiguous, there is no need for a contiguous stream of writes to occur. For instance, the writes that occur to the data structure could randomly perform the writes to the block, each time accessing a different random byte of the block. The end result, however, is that the written data forms a contiguous block of data.

In some examples, the data bits and the metadata bits are aligned with a boundary by adding padding bits at the beginning or end. In some systems, it may be necessary for data to be stored in the memory in accordance with particular boundaries. For example, more efficient handling of data may be possible if information stored to memory is stored at an address that is aligned to a multiple of the size of the information being stored. In such an example where a data value and a metadata value are 32 bits (4 bytes) each, it may be desirable to store data values so that they are aligned to 4 byte boundaries, and to store combined data and metadata values so that the combined type is aligned to an 8 byte boundary. In some architectures, data structures (such as stack frames) must be aligned (e.g. 8 byte aligned). Since the data structure may be of variable size, padding can be added to the beginning or the end of the data bits and metadata bits such that the boundary is preserved. In some embodiments, the amount of padding is stored so that later load operations can correctly access the requested data.

In some examples, the execution circuitry is further responsive to the store operation to additionally store type bits, comprising a value derived from the mode bit storage circuitry, to the data structure. As previously explained, the mode bit storage circuitry can be used to indicate a mode (data or metadata) of each of the registers. In these examples, type bits can be derived from at least some of the bits of the mode bit storage circuitry, and the type bits can be stored to the data structure. Consequently, it is possible to store information that helps to understand what is stored in the data structure. This makes it possible to perform a subsequent load operation on the data structure, and for the contents of the data structure to be correctly interpreted. For instance, the type bits could indicate the value of the mode bit storage circuitry at a time when contents of (at least some of) the registers are stored to the data structure. The value can be derived from the mode bit storage circuitry in a number of ways. Firstly, it may not be necessary to store the entire contents of the mode bit storage circuitry. In particular, it may not be necessary to store the mode of registers whose contents are not being stored to the data structure. In addition to this, it could be sufficient to store only bits that indicate which of the plurality of registers is in the metadata mode (for instance), with other unspecified registers being assumed to be in the data mode. The reverse is also true. Furthermore, certain registers could always be assumed to be in a particular mode or the metadata could be considered to be unimportant, in which case it may not be necessary to store the mode of those registers. In other situations, the type bits could be derived by indicating a number of the registers to be saved that are in the data mode and a number that are in the metadata mode.

In some examples, the data processing apparatus comprises: further mode bit storage circuitry to store category bits to indicate which elements in the data structure are of a data type and which of the elements in the data structure are of a combined type; and the category bits are derived using the mode bit storage circuitry. In this way, it is possible to store, within the further mode bit storage circuitry, an indication of the nature of elements within the data structure. Elements having the data type correspond with saved data bits from registers whereas elements having the combined type correspond with saved data and metadata bits from registers. The indication makes it possible to more easily access (e.g. load and store) elements within the data structure without having to first perform a memory operation to obtain type bits out of the memory. Instead, the further mode bit storage circuitry stores category bits. These can be derived from the mode bit storage circuitry in similar ways to how the type bits can be derived from the mode bit storage circuitry.

In some examples, the execution circuitry is further responsive to the store operation to additionally store type bits to the data structure, and to update the further mode bit storage circuitry based on current values of the mode bit storage circuitry; and the type bits are derived from the category bits stored in the further mode bit storage circuitry. When a store operation occurs, relevant contents of the registers that are to be stored are stored to the data structure. In addition, the category bits in the further mode bit storage circuitry are updated based on the value of the mode bit storage circuitry. As before, the category bits are derived from the mode bit storage circuitry and this neither necessitates all of the bits being considered, nor the same format being adopted. The further mode bit storage circuitry therefore indicates the nature of the elements that have been most recently stored in the data structure. Meanwhile, the old version of the further mode bit storage circuitry is used to derive type bits that are stored to the data structure. In a situation in which the store operation occurs as a consequence of a function call, for instance, the further mode bit storage circuitry stores category bits that represent whether the contents of the stored stack frame associated with each stored register is data or data and metadata. In addition, the stack stores the previous value of the further mode bit storage circuitry, which represent whether the contents of the registers stored in the caller's stack frame is data or data and metadata. Storing the type information in this manner can be beneficial, since it makes the type information regarding the current stack easy to access.

In accordance with a second example configuration there is provided a data processing apparatus comprising: a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid; mode bit storage circuitry adapted to indicate whether each of the registers is in the data mode or the metadata mode; and execution circuitry, responsive to a memory operation that is a load operation on one or more given elements of a data structure in a memory: to determine whether an element in the one or more given elements is of a data type or a combined type, to load the element into the data bits of one of the registers and to set the mode bit storage circuitry to indicate that the one of the registers is in the data mode when the element is of the data type, and to load the element into the data bits and the metadata bits of one of the registers when the element is of the combined type.

By analogy to circuitry that performs the store operation, it is possible to provide corresponding circuitry to perform a load operation. In these embodiments, the load (access) operation indicates one or more elements of a data structure in memory that is to be loaded into the plurality of registers. The execution circuitry determines whether the elements to be loaded are of a data type (e.g. made up of data) or a combined type (e.g. having both data and metadata). Where it is determined that the element has only data (e.g. where the element is of the data type), the data is loaded into the data bits of one of the registers and the mode bit storage circuitry is updated to indicate that register is in the data mode. Where it is determined that the element has both data and metadata (e.g. where the element is of the combined type), the data and the metadata are loaded into a register. In some situations, the mode bit storage circuitry is also updated to indicate that the register is in the metadata mode. In other situations, the mode bit storage circuitry is updated based on the content of the data and/or metadata such as whether a particular bit is set or not. Such circuitry can be used to load data that has been efficiently stored by the circuitry used for storing registers.

In some examples, the execution circuitry is configured to load the element into the one of the registers by: loading the data from the element into the data bits of one of the registers without loading into the metadata bits of the one of the registers, when the element is of the data type, and loading the data and the metadata from the element into the one of the registers when the element is of the combined type. When the element is of the data type, indicating that there are no valid corresponding metadata bits that have been stored together with the data bits, the data bits of that element are loaded into one of the registers and no corresponding metadata bits are loaded into that register as part of the same operation. However, when the element is of the combined type, indicating that there is valid data with corresponding valid metadata, both data and the metadata are loaded into a single one of the registers.

In some examples, the execution circuitry is adapted to determine whether the element in the one or more given elements is of the data type or the combined type by referring to at least part of the data structure. In these examples, the execution circuitry is able to refer to part of the data structure in order to determine whether a particular element is of the data type or the combined type. This could be achieved if, for instance, the data structure has stored information (e.g. one or more bytes) that indicates a type of elements in the data structure. For instance, the byte(s) could provide a bit field that indicates those elements in the data structure that are of the data type. Alternatively, the byte(s) could present a bit field that indicates those elements in the data structure that are of the combined type. In yet other embodiments, the byte(s) may explicitly specify each of the data type and the combined type for each element in the data structure, or could indicate a number of elements of each type.

In some examples, the data processing apparatus comprises: further mode bit storage circuitry to store category bits to indicate which of the elements in the data structure are of the data type and which of the elements in the data structure are of the combined type; and the execution circuitry is adapted to determine whether the element in the one or more given elements is of the data type or the combined type by referring to the further mode bit storage circuitry; and in response to the load operation the execution circuitry is configured to set the further mode bit storage circuitry to a value derived from at least part of the data structure. The further mode bit storage circuitry could take the form of a register and can be used in order to indicate the types of elements that are stored within the data structure of memory. By providing this information in, for instance, a register, it is possible to access the data elements more quickly than if the type of elements has to be assessed from the memory—which would involve performing a first memory access to obtain the type information and then a second memory access to access the necessary element from memory. Since memory access tends to be slow, this would involve a large delay each time a data element is to be accessed. In these examples, this problem is overcome by, when a load operation takes place, obtaining the required type information from a register (the further mode bit storage), and then setting the further mode bit storage circuitry according to a value that is stored within the data structure in memory. Thus each load operation can access the type information quickly and directly from a register, and preloading the type information to the register for the next load operation. Furthermore, in such examples, the data structure can be adapted to store the value of the previous data structure. Consequently, when that data structure is encountered, the type of the elements is already known and need not be loaded from memory. This is achieved by, at a time of loading elements, loading the next required value for accessing a next data structure.

In some examples, there is provided a data processing system comprising: a first data processing apparatus according to one of the examples of the first configuration, and a second data processing apparatus according to one of the examples of the second example configuration. Such systems may therefore include execution circuitry for performing a store operation and execution circuitry for performing a load operation as previously described. In some examples, the same execution circuitry may be used for performing both the store operation and the load operation. Furthermore, other circuits within the two example configurations that share the same name could also be provided as a single circuit rather than providing two distinct circuits. Such a system is therefore able to efficiently store and load data from the registers that can operate in either of the data mode and the metadata mode.

In some examples, the data processing apparatus comprises: further execution circuitry, responsive to a further operation to calculate and return an address of a further data value in the memory in dependence on the category bits and an operand of the further operation. The further operation may be used in order to determine an address of a further data value in the memory. In particular, since the number of elements contained within the data structure that are of the data type, and the number of elements in the data structure that are of the metadata type will affect the size of the data structure, it is necessary to know the type of these elements in order to determine the size of the data structure and thereby access the further data value when the address of the further data value is dependent on the size of the data structure. For instance, if the further data value occurs prior to the data structure in the memory, then it may be necessary in order to know the size of the data structure in order to determine the relative address of the further data value. Accordingly, the further operation may be used to calculate this address based on the category bits (which indicate the number and type of each of the elements in the memory) and an operand, which could for instance be used to indicate an offset from the data structure to the desired further data value, such as an argument number of a function call, for instance.

In some examples, the data processing apparatus comprises: further execution circuitry, responsive to a further operation to calculate and access an address of a further data value in the memory in dependence on the category bits and an operand of the further operation. In these examples, the further operation may be used in order to access an address of the further data value in the memory. Consequently, rather than merely calculating the address of the further data value, the data value itself is accessed.

In some examples, when the mode bit storage circuitry indicates a particular register of the plurality of registers is in the metadata mode, the data of the particular register comprises a pointer and the metadata of the particular register comprises bounds information to constrain a range of addresses the pointer can be used to access, and access information to constrain operations performed in dependence on the pointer, the access information comprising at least one of: read permission information indicative of whether the pointer can be used to read a memory address; write permission information indicative of whether the pointer can be used to write to a memory address; branch permission information indicative of whether the pointer can be used to perform a branch operation to a memory address; and execution permission information indicative of whether instructions within the range of addresses can be executed. One example use of the metadata is to provide security information in relation to the data. In particular, if a pointer is provided as part of the data, the metadata could be used in order to provide access information that can be used to constrain operations (including memory accesses) that are performed using that pointer. For instance, the pointer could be used to refer to an area of memory. However, the metadata could be used to indicate the boundaries of an area of memory so that if the pointer is used to access a memory address outside that boundary, the access will fail. Similarly, the access information could be used to indicate whether a particular memory location determined from the pointer can be read or written to. Furthermore, the access information could indicate whether the memory location that is accessed based on the pointer can be used to perform a branch operation. The access information could also (or alternatively) be used to indicate whether instructions within the range of addresses (e.g. defined by the boundaries) can be executed. Other ways of constraining the use of the pointer will be apparent to the skilled person. In some embodiments the data and metadata may form a capability, examples of such arrangements are discussed in the paper "CHERI: A Hybrid Capability-System Architecture for Scalable Software Compartmentalization", 2015 IEEE Symposium on Security and Privacy, 17-21 May 2015, ISBN 978-1-4673-6949-7, the contents of which are incorporated herein by reference. In such embodiments at least when the data and metadata are stored in memory, the metadata may be accompanied by a tag to indicate that the capability is uncorrupted. Such a tag may be hidden from software and not directly accessible. Stores to a subset of a capability in memory may result in the tag being cleared. Thus if an attacker attempts to modify the access information to gain additional permissions such an attempt may result in the tag being cleared and therefore marking the capability as corrupted. This in turn may prevent the attacker using the adjusted capability to access information that they do not have permission to access. The tag bit may be provided as an additional hidden bit. For example if the data is 32 bits, and the metadata is a further 32 bits, then the capability may be 65 bits with the tag being the $65^{th}$ bit which isn't addressable by software. To simplify the circuitry of the memory it may be desirable to align the storage of such capabilities to 64 bit boundaries such that the additional bit for the tag (the $65^{th}$ bit) may only be provided for every 64 bits of memory. To gain the full protection provided by the tag bit, it may be desirable to always store the data and the respective metadata and tag for a capability together. In this way an attempt to corrupt any part of the capability (data or metadata) can be detected by the memory circuitry and thus result in the tag being cleared. In some embodiments the mode storage bits in the mode bit storage circuitry may be used to record the state of the tag bits when capabilities are stored within the registers. For instance, when a data element is loaded from the data structure in memory into a register, the mode bit storage circuitry is updated based on whether the data element in the memory has a tag set to indicate that the metadata is for an uncorrupted capability.

In some examples, the data structure is a stack frame. A stack frame can be used by a function in a computer program, with a collection of stack frames making up a stack. In particular, based on the calling convention, data can be structured so as to be preserved when execution passes from a caller to a callee during the function call. This may involve the values of particular registers being stored to the stack frame, for instance, if those registers are likely to be overwritten by the callee function and if the data currently in those registers will still be required by the caller function after the function call has returned. In such a situation, it may be necessary for the contents of that register to be stored to the stack frame. In practice, this can result in a number of stack frames being stored within the memory as a consequence of a number of subsequent or nested function calls being made. It will be appreciated that in some data processing apparatuses, the amount of memory is limited and therefore efficient use of the memory space such as by not inflating the size of the stack frames, can be beneficial.

In some examples, in response to the memory operation, the execution circuitry is adapted to access the data structure in the memory such that the data bits of those of the one or more given registers that are in the data mode are contiguous within the data structure, and the data bits and the metadata bits of those of the one or more given registers that are in the metadata mode are contiguous within the data structure. One way of efficiently making use of the memory space is by contiguously storing particular elements. In particular, the data bits of registers that are in the data mode can be gathered together and stored as a single contiguous block within the data structure. Similarly, the data bits and the metadata bits of registers that are in the metadata mode can be gathered together and stored within a second contiguous block within the data structure. Note that this does not necessitate storage operations themselves being performed contiguously. In particular, the store operations could occur randomly provided that the end result is the data being stored contiguously. By storing the data in this manner, it is possible to make more efficient use of memory. For instance, if odd registers are in the metadata mode and even registers are in the data mode, then to store each of the registers in order would in substantial gaps within the data structure in memory. For example, if the values of registers in metadata mode represent capabilities, then as described earlier this may require that the data and metadata value for each capability be stored together, and aligned to a 64 bit boundary in memory (in the case where the data is 32 bits, and the access information of the metadata is 32 bits).

Particular embodiments will now be described with reference to the figures.

FIG. 1 illustrates a data processing system 100 in accordance with some embodiments. The system includes execution circuitry 110, which is able to respond to access operations in the form of store operations to store registers 120 to a data structure 145 in a memory 140 and load operations to load elements of the data structure 145 in the memory 140 to the registers 120. In this example, some of the registers 120 are capable of storing both data and metadata. The remaining registers are capable of storing only data. Although the registers that are capable of storing metadata and data can store both metadata and data, they may also be used to store only data. When one of these registers stores both valid metadata and valid data, it is said to be operating in a metadata mode whereas when the register stores only valid data, it is said to be operating in the data mode. The mode of each of these registers is represented in mode bit storage circuitry 130. In this example, a '1' indicates that the register is in the metadata mode, while a '0' indicates that the register is in the data mode. A hyphen indicates that the register is incapable of operating in the metadata mode and thus only stores data. In some embodiments a register being in metadata mode indicates that the register contains a valid capability.

Note that the previous description referred to the registers 120 storing valid metadata. This is because such registers always store metadata—it is not possible for a register to store nothing. For instance, consider a situation in which a register was in the metadata mode of operation, and then switched to operating in the data mode of operation. In this situation, the register will still contain the old metadata. Even if the metadata is zero'd, metadata still exists in the form of zeros. However, such metadata is not considered to be valid, because it is an old or empty value that is no longer desired. Consequently, the register is said to store invalid metadata and valid data.

The execution circuitry 110 consults the mode bit storage circuitry 130 in order to store the values of certain registers 120 to the data structure 145 in memory 140. In particular, for a register that is in the metadata mode and that is to be stored to the data structure 145, the execution circuitry 110 will store the data bits and the metadata bits to the data structure 145. However, for a register that is in the data mode and that is to be stored to the data structure 145, the execution circuitry 110 will store only the data bits of the register 120 in the data structure 145. Clearly, for registers that are not capable of operating in the metadata mode, only the data bits will be stored. The exact set of registers that are to be stored by the execution circuitry 110 can be specified as part of the store operation. These can be specified either explicitly by naming the registers that are to be stored (which may be encoded in the instruction opcode as a bitmask where each bit has an associated register, and the value of that bit indicates whether the associated register is to be stored), or indirectly by identifying the registers via another register or by a memory location, for instance. In other cases, the store operation may cause particular registers to be automatically stored to the data structure 145 without being specified. Other techniques of specifying the storage set will be known to the skilled person. Since the execution circuitry 110 stores only the bits that are considered to be valid, storage space in the data structure 145 is not wasted. In particular, invalid bits are not stored (e.g. dummy bits are not added in order to treat registers in the data mode as having dummy metadata). Furthermore, the storage of the registers 120 can be performed in a single store operation, if desired.

In this example, the same execution circuitry 110 is also capable of performing a load operation to load data elements from the data structure 145 to the registers 120. It will be appreciated that for such an operation to occur, it is necessary to know the nature of each of the elements within the data structure 145 that are to be loaded. In particular, it is necessary to know whether a particular element comprises data or both data and metadata. Note that since the mode bit storage circuitry 130 relates to the mode of each of the registers 120, this is unlikely to correspond with the type of the elements within the data structure 145. In particular, the elements that are stored within the data structure 145 could have been stored at a previous time, after which the mode and content of the registers 120 could have been changed. There are a number of ways in which the nature of the elements can be deduced. These will be explored in the following figures. However, one way in which this information can be acquired is by storing the information—either in a further storage circuit or within the memory 140.

Note that in this example, as previously stated, the execution circuitry 110 performs both store operations and load operations. However, in other embodiments, separate execution circuitry may be provided for store operations and load operations.

Figure 2A:
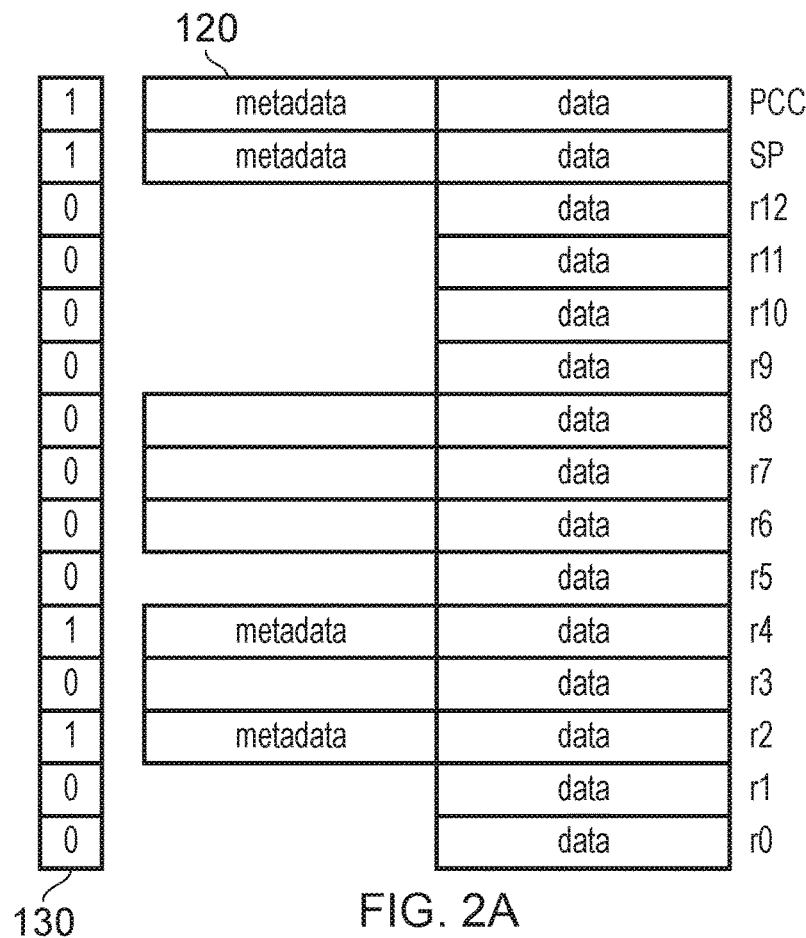
FIG. 2 (made up of FIGS. 2A and 2B) illustrates the state of the registers and the corresponding data structure in accordance with some embodiments.
Figure 2B:
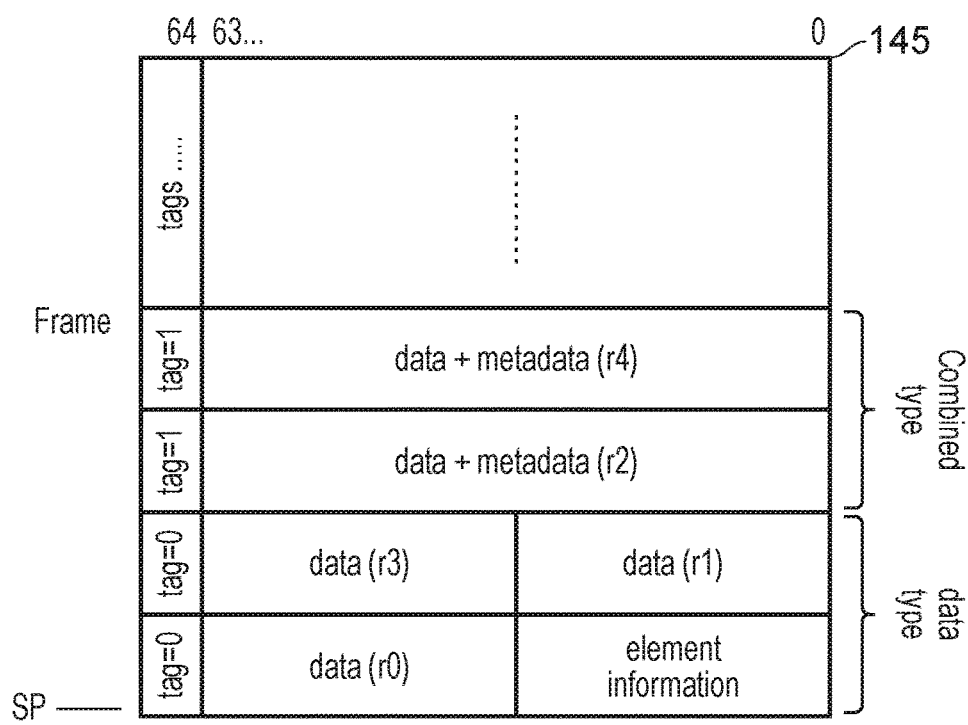

FIGS. 2A and 2B illustrate how the contents of registers 120 may be stored into a data structure 145 such as a stack. In the example of FIG. 2A, it can be seen that registers r0, r1, r5, r9, r10, r11, and r12 are all incapable of operating within the metadata mode. In this example, the mode bit storage circuitry 130 considers such registers to be in the data mode of operation (indicated by a '0'). It will be appreciated that as these registers can never store metadata the associated mode bits may always be '0' and therefore these mode bits may be hardwired to eliminate the associated storage bit. Registers r2, r4, SP, and PCC (Program Counter Capability) are each able to store data and metadata and do so as indicated by a '1' in the corresponding entry of the mode bit storage circuitry 130. Meanwhile, registers r3, r6, r7, and r8 are all capable of storing data and metadata but store only data as indicated by a '0' in the corresponding entry of the mode bit storage circuitry 130.

FIG. 2B illustrates the state of the data structure 145 (taking the form of a stack having a stack pointer SP) when registers r0 to r4 are requested to be stored by a store operation. As can be seen from FIG. 2B, the valid contents of registers r2 and r4—made up of data and metadata—are stored as a first contiguous block. Furthermore, the valid content of registers r0, r1, and r3—made up of data—are stored as a second contiguous block. The two contiguous blocks are also, in this example, stored as a single contiguous block. Note that although these various blocks are contiguous blocks, there is no necessity for the registers to be stored using contiguous writes. For instance, taking the example of FIG. 2B, a first write could store the data and metadata of register r2, a second write could store the data of register r0, and a third write could store the data and metadata of register r4. The write to the contiguous block could therefore be described as being "random access". Having stored the valid contents of each of the registers as contiguous blocks, the valid contents of these registers can be stored more compactly than if, for instance, the registers were stored in numerical order. In the case where the data and metadata represent a capability this arrangement maintains the integrity of the capability by keeping the metadata and tag values together with their respective data values. FIG. 2B also illustrates the hidden tag bits and their values (bit 64, i.e. the $65^{th}$ bits counting from bit 0) associated with each 64 bits of memory.

As previously explained, it is necessary to provide information regarding the elements within the data structure 145. This is because, for a given element, it is not immediately clear whether that element includes data and metadata, or data from two registers. For instance, if an access is made to a given line of the data structure 145, this could relate to the data and metadata of a single register r4, or this could relate to the data for register r3 and the data for register r1. Types are associated with each element in order to indicate the content of that element. In particular, the "combined" type refers to an element that contains both data and metadata, whereas the "data" type refers to an element that contains only data. As previously explained, there are a number of solutions to how the type of each element can be recorded so that this can be later loaded into an appropriate register. For instance, the entry relating to register r2 cannot be inserted into register r1 of FIG. 2A, since such a register does not support storing the metadata that is in the element shown in the data structure 145 of FIG. 2B. In this example, element information is provided in order to indicate a type of each of the elements within the data structure 145. Consequently, when the elements of the data structure 145 are to be loaded into memory, the element information is loaded first. This assists the loading of the remaining elements into appropriate registers 120.

Figure 3:
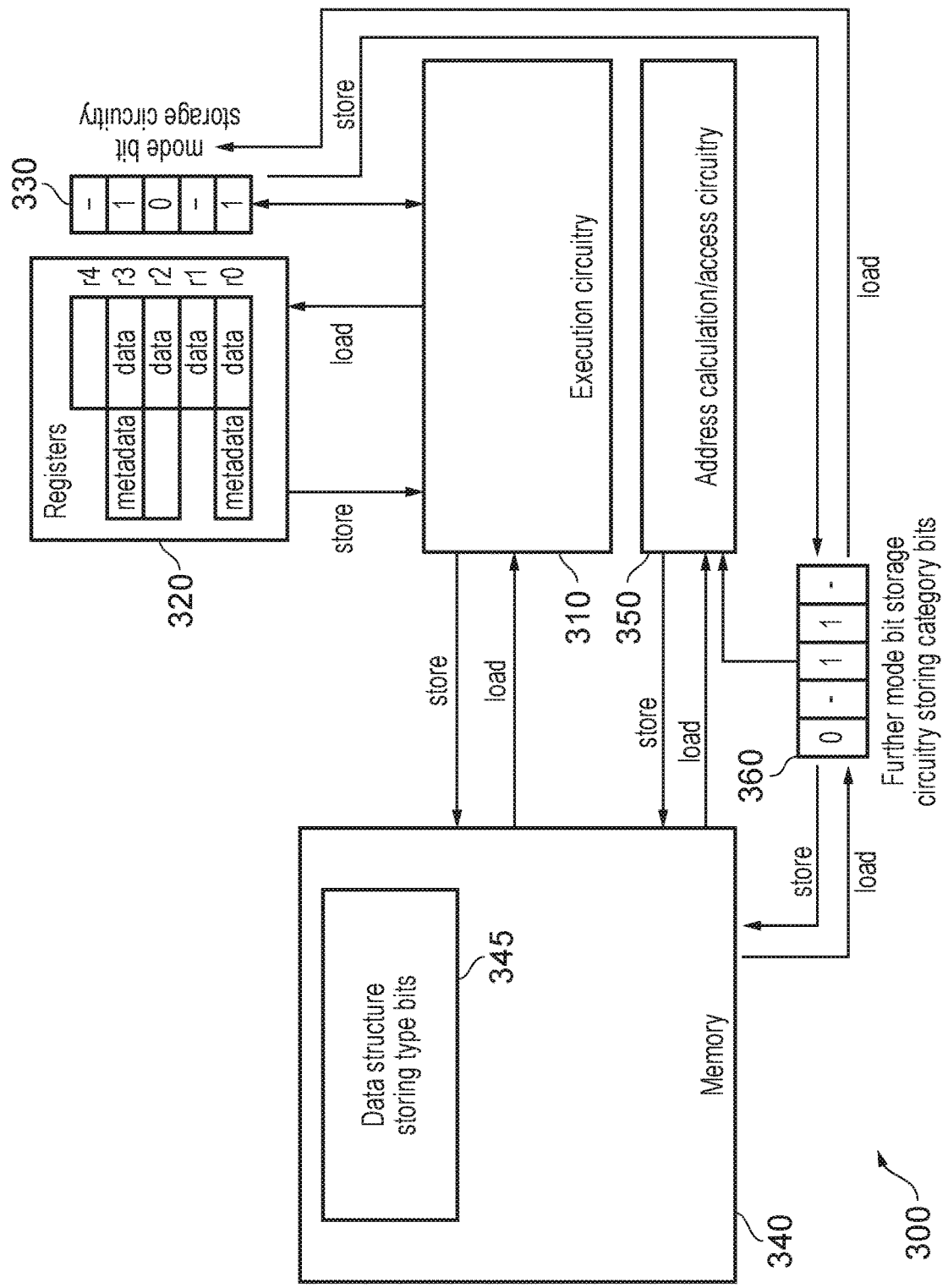
FIG. 3 illustrates a data processing system in accordance with some embodiments.

FIG. 3 illustrates a data processing system 300. The data processing system 300 is similar to the data processing system 100 discussed with regard to FIG. 1. In this example, however, a different approach is used to storing information regarding the nature of the elements of the data structure, which reduces the time necessary to access the data structure. In particular, in the example shown in FIG. 2B, when a first access is to be made to the data structure, it is firstly necessary to acquire the element information from memory and to process this element information before further accesses to memory can be made. Given that memory accesses can be slow, this can result in significant delay to access the elements of the data structure 145. The type information is necessary to cause each of the elements of the data structure 145 to be loaded into appropriate registers 120 and so cannot simply be ignored. In the system 300 of FIG. 3, further mode bit storage circuitry 360 is provided that stores the nature of the elements in the current data structure 345. During a store operation, the execution circuitry 310 causes the type bits in the mode bit storage circuitry 330 that belong to the registers whose contents are being stored in the data structure 345 to be used to in order to form category bits that are stored in further mode bit storage circuitry 360. For example, if registers r0 and r2 are stored as part of a store operation into the data structure 345, then the mode bits of those registers in the mode bit storage circuitry 330 are stored in the further mode bit storage circuitry 360. Note that the bits themselves need not be stored, and instead a representation of some of this information can instead be derived and stored. There are a number of ways in which the category bits can be derived. As previously explained, the type bits could simply be copied into the further mode bit storage circuitry. In other embodiments, only bits indicating a particular type are copied into the further mode bit storage circuitry with unlisted elements being assumed to have the other type. In another example, the further mode bit storage circuitry 360 stores a number of elements in the data structure 345 that have the data type, and a number of elements in the data structure 345 that have the combined type. Having stored the category bits in the further mode bit storage circuitry, the elements of the data structure 345 can be accessed. This is because the contents of the data structure 345 can be interpreted so that the appropriate elements are loaded into suitable registers 320 during a load operation. When a second store operation occurs, the value of the further mode bit storage circuitry is also stored to the data structure. During a load operation, the category bits are loaded back into the further mode bit storage circuitry 360. When a second load operation occurs, the category bits are used to set the bits of the mode bit storage circuitry 330 while elements of the data structure 345 are loaded back into the registers 320.

This process increases efficiency since the current contents of the data structure 345 can be known without having to loading type information from memory during each access. The need to replace the contents of the further mode bit storage circuitry (e.g. during nested function calls) is achieved by storing the value of the further mode bit storage circuitry 360 to memory 340 (e.g. part of the data structure 345) when the value is no longer immediately required.

The system 300 also includes address calculation/access circuitry 350. It will be appreciated that a size of the data structure 345 can vary and may not be determined in advance of code being executed (because it may not be known in advance whether a register will store a metadata and data value, or just a data value). This can make it difficult to access data in the memory 340 whose location is dependent on the size of the data structure 345. Consequently, the address calculation/access circuitry 350 can use the category bits of the further mode bits storage circuitry 360 to determine the location of a particular item of data within the memory 340. For example, by providing an offset that indicates a location of the requested data item relative to one end of the data structure, the address calculation/ access circuitry 350 can use the category bits to indicate a size of the data structure 345 and thereby either return a calculated address of the requested data item or directly access the requested data item itself. In this example, a single circuitry 350 is provided for both operations. However, in other embodiments, a separate address calculation circuit and address access circuit can be provided for each of the two operations. In some embodiments such instructions may implicitly calculate the address based on the current stack pointer value (held in the SP register), which may point to the bottom of the data structure. In other embodiments the instructions may calculate the address based on the value of a register whose identifier is specified in the instruction operation code.

Figure 4:
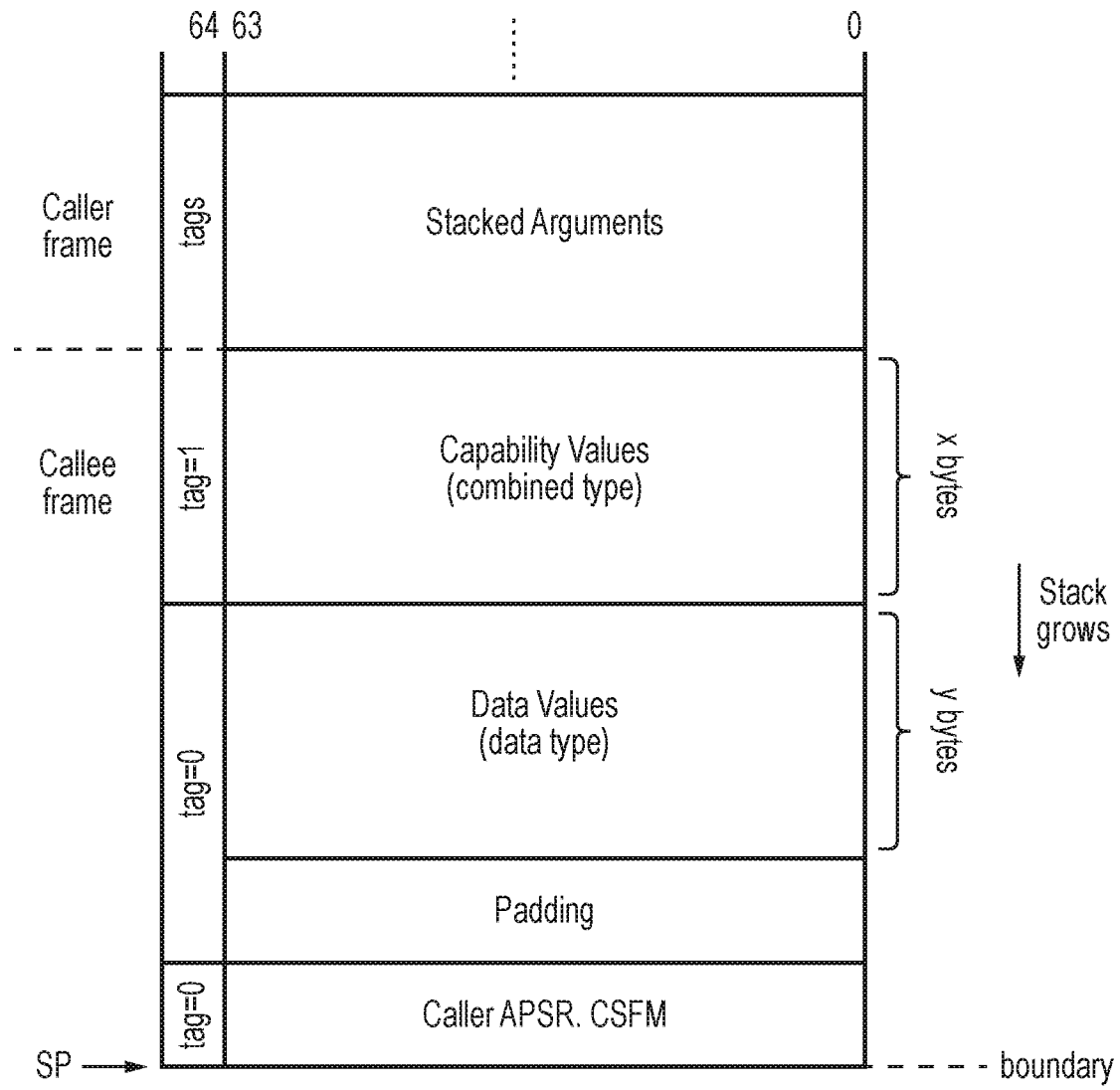
FIG. 4 illustrates and example of a stack that contains two frames, with each frame corresponding to a data structure in accordance with some embodiments.

FIG. 4 illustrates an example of a stack, which contains two frames. The bottom frame (the callee frame) corresponds to the data structure 345, whereas the top frame (the caller frame) is a different format and contain function arguments. During a function call, a caller pushes one or more stack arguments for the function call onto the current stack frame. A new stack frame is then created for the callee. The callee then saves one or more register values to the stack frame so that those registers can be used by the callee. In this example, the callee firstly saves capability values, which are of the combined type. Capability values include both a data component and a metadata component as will be described later. Collectively, the capability values occupy x bytes of the stack frame. The callee then saves data values to the stack frame. These are of the data type and occupy y bytes. The category bits stored within the further mode bit storage circuitry 360 (APSR.CSFM) are then saved to the stack frame. These correspond with the types of the elements stored in the data structure of the caller. In other words, these represent the types of the elements that are stored in the stack frame belonging to the caller. In this example, the architecture demands that all of the data stored as part of a function call reaches a particular byte boundary. Consequently, one or more padding bytes are added in order to pad out the data such that the data collectively extends to a particular point. In some embodiments any padding required may be at the bottom of the stack frame, while in other embodiments may be between the stacked ASPR.CSFM value and the data values, or between the data values and the capability values. As previously described, the further mode bit storage circuitry 360 stores information that makes it possible, in combination with other information (such as which registers were stored to the stack frame 345), to determine both x and y. In addition, the further mode bit storage circuitry 360 provides information that makes it possible to determine the extent of any padding that has been added. This could simply be determined based on the number of elements that are of the data type and the number that are of the combined type, or could be stored as an explicit value. In this way, when it is desired to access a particular argument from, for instance, the stack arguments, the relative distance between the stack pointer (SP) and the requested argument can be determined. Accordingly, the stack argument can be accessed even though the space used to store the capability values and the data value may be unknown.

FIG. 5 shows an example of a function call being made from an outer function to an inner function. Here, the outer function begins by pushing the value of a register r4 onto the stack using the CPUSH instruction. As a consequence, the CPUSH instruction also pushes the value of APSR.CSFM (the further mode bit storage circuitry) to the stack. This makes it possible to update the further mode bit storage circuitry 360 to indicate that the current data structure 345 contains an element corresponding with the register r4 (data and possibly metadata). This operation is performed because, as later seen, the register r4 is used by the outer function. As r4 is a callee saved register, the previous value of the register r4 must be saved so that it can later be used and then restored before the outer function returns. The outer function then makes a function call to the inner function. In the inner function, a similar process occurs. In particular, the value of the register r6 is pushed to the stack using another CPUSH instruction. Note that since the current contents of register r6 do not belong to the inner function, and since the inner function might be compiled separately from any other function, it is not known at compile time whether the contents of the register r6 will be data, or data and metadata. Furthermore, the contents could change depending on whether the inner function is called from the outer function, or another function (e.g. outer2). Hence, it is necessary to consider what is stored in the register before those contents can be saved. Since the inner function is a different function to the outer function, the value of register r6 is pushed to a different frame (data structure) of the stack than for the outer function. Similarly, the value of ASPR.CSFM is also pushed to the stack frame by the "CPUSH r6" instruction. Again, this occurs so that the fact that a data element having the type of register r6 has been stored to the frame can be recorded in APSR.CSFM. The inner function then performs a load operation, and an add operation that make use of register r6 (explaining the need for the previous value of register r6 to be saved, as similarly, r6 is also a callee saved register). The inner function then makes preparations to return back to the outer function. In particular, when the stack frame is to be popped and the previous value of register r6 restored, the type of the previous value to be restored can be determined from the current value of APSR.CSFM, so it can be determined whether a metadata and data value should be popped from the stack frame into register r6, or whether just data should be popped from the stack frame into register r6. The value of ASPR.CSFM that was previously pushed to the stack (by the "CPUSH r6" instruction) is popped from the stack (by the "CPOP r6" instruction). The inner function then returns to the outer function. When the function returns, a further division operations occurs on register r4. Note that the inner function did not save the contents of register r4, since the inner function did not make use of this register. Consequently, there was no need for it to be saved. The outer function then again pops an element from the stack frame now pointed to by the stack pointer into register r4 (using the "CPOP r4" instruction), the type of which can be determined by the ASPR.CSFM value. The "CPOP r4" instruction also causes the APSR.CSFM value to be popped and restored to the value it had before the outer function was called. It will be appreciated that although each CPUSH/CPOP instruction shown in FIG. 5 only saves/restores a single register and the APSR.CSFM value, in some embodiments these instructions may be operable to save/restore multiple registers (as shown in FIG. 4), but that only a single CSFM value would need to be saved/restored along with the multiple register values (as the CSFM value can contain information relating to type of multiple registers). An example of an instruction that saves multiple registers is "CPUSH {r4, r5, r6}". It will be appreciated that the instruction may enable an arbitrary list of registers (r4 to r6 in this example) to be pushed. In some embodiments the operation code for the instruction may contain a bit mask, with each bit within the bit mask corresponding to a register. The value of these bits may indicate whether the associated register is to be pushed. A CPOP instruction operable to pop multiple registers may be implemented in a similar way.

Figure 6:
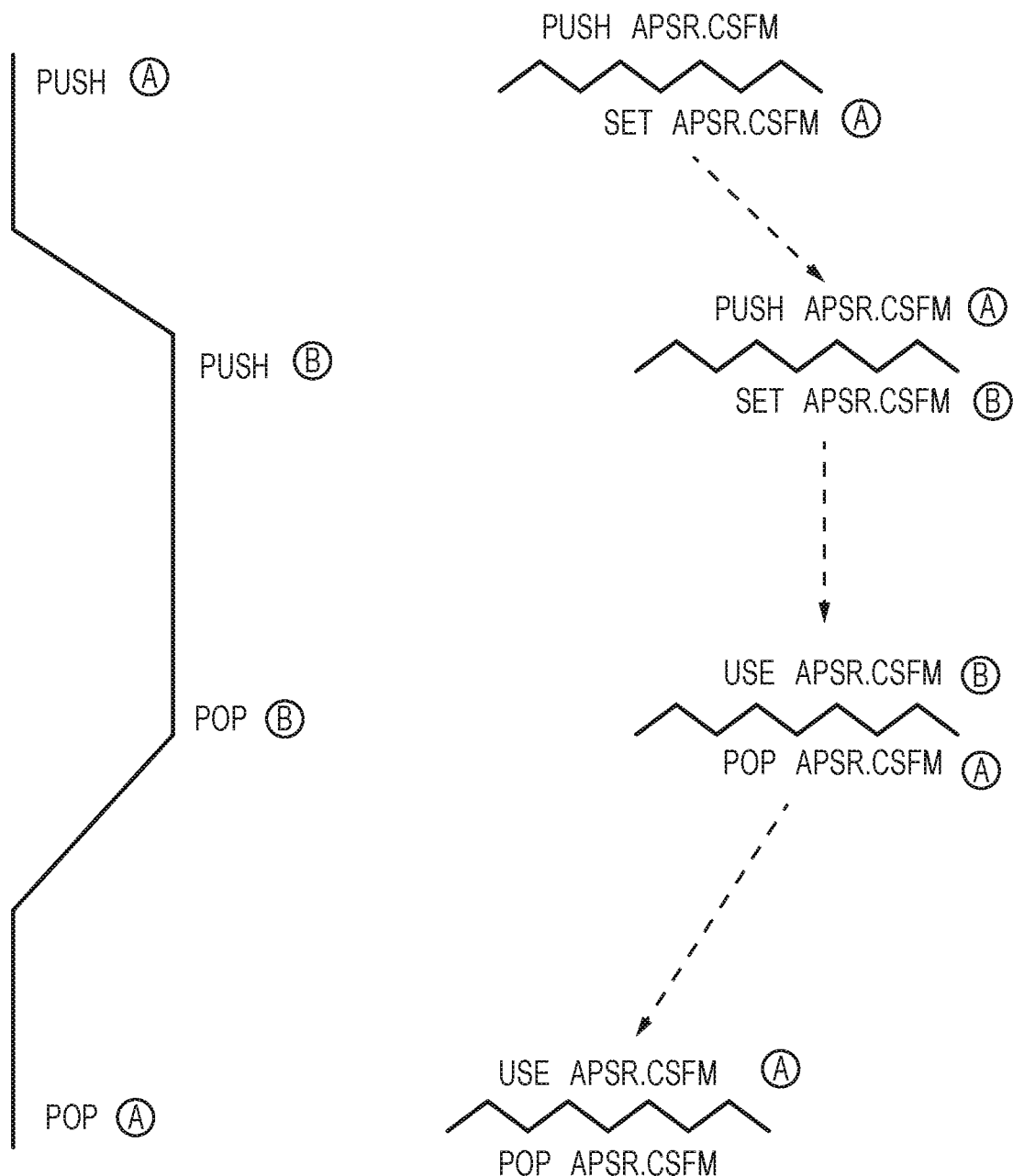
FIG. 6 illustrates the flow that occurs with regards to the further mode bit storage circuitry in respect of repeated nested function calls in accordance with some embodiments.

FIG. 6 illustrates the flow that occurs with regards to the further mode bit storage circuitry 360 in respect of repeated nested function calls. At a first function, register A is pushed to the stack frame. At the same time, the current value of APSR.CSFM is also pushed to the stack frame and the value of APSR.CSFM is then set to indicate the type of the data (of register A) that has been pushed. During a subsequent function call, a further stack frame is created and the value of a register B is pushed to the stack. In addition, the current value of APSR.CSFM is pushed to the stack. The value of APSR.CSFM is then set to indicate that the stack frame contains a value whose type corresponds with the data in register B. Before a function return, the value of APSR.CSFM is used in order to determine the type of the data on the stack frame and to restore the data value. The value of APSR.CSFM that is stored on the stack frame is then popped. This value provides information regarding the type of the next element on the next stack frame, which is then obtained. Then, before the next function return, the value of APSR.CSFM that contains the type information of the data that was in register A is used to pop that element from the stack frame. Furthermore, the initial value of APSR.CSFM is popped from the stack frame.

Figure 7:
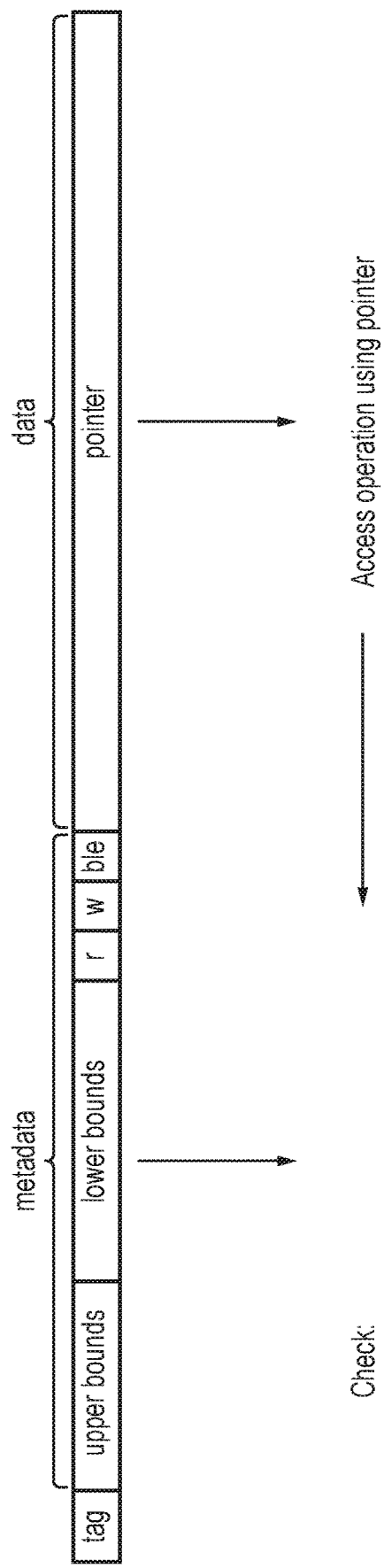
FIG. 7 illustrates an example of metadata in the form of capability information in accordance with some embodiments.

FIG. 7 illustrates an example of metadata in the form of capability information. Here, the data takes the form of a pointer, which provides a memory address in the memory. The metadata comprises access information that is used to limit how the pointer is used in order to perform the access operation. In particular, in this example, the metadata includes an upper bounds and an lower bounds of an area of the memory that the pointer can be used to access. For instance, if the upper bound is a memory address 100, and the lower bound is a memory address 50, and the pointer P points to an address 98, then an attempt to access the location of the P+8 (106) will be refused since this violates the upper boundary condition (100). Similarly, the metadata contains a set of read (r), write (w) and branch (b) or execute (e) permissions. The read permission makes it possible to control an access operation within the boundary to allow the access operation to be a read operation. The write permission makes it possible to control an access operation within the boundary to allow the access operation to be a write operation. The branch permission makes it possible to, for instance, perform a branch operation to a memory address between the upper bounds and lower bounds. Meanwhile, the execute permission controls whether instructions within the range of addresses (e.g. defined by the upper and lower bounds) can be executed.

Other forms of execution will be understood by the skilled person. In some embodiments, the memory address is a memory address of the same memory 140; 340 that stores the data structure 145; 345. However, in other embodiments, the memory may be a different memory. It will understood by the skilled person that the upper and lower bounds may be represented in a variety of formats. For example they may be encoded as absolute addresses, or as offsets from the pointer value. The bounds may also be represented in a floating point format so that a compact representation can handle large bounds. As described earlier, the metadata for the capability may be accompanied by a tag bit hidden from software to maintain the integrity of the capability. Furthermore, rather than upper and lower bounds, a lower bound and a range could be provided, for instance.

The capability also includes a tag. This tag indicates whether the capability, as a whole, is corrupted or not. For example, a cleared tag (or a tag of '0') can be used to indicate that the capability is corrupted. Such a tag can be used to inform the value set in the mode bit storage circuitry 130; 330 when a data element is loaded into the registers 120; 320. For instance, if the tag indicates that the capability is corrupted, the metadata is loaded into the metadata bits, but the register could be marked as being in the data mode of operation, since the metadata is corrupted and therefore not usable. For a capability stored in the registers 120; 320, corruption could be marked by switching the register from metadata mode to data mode, in order to render the metadata invalid.

Figure 8:
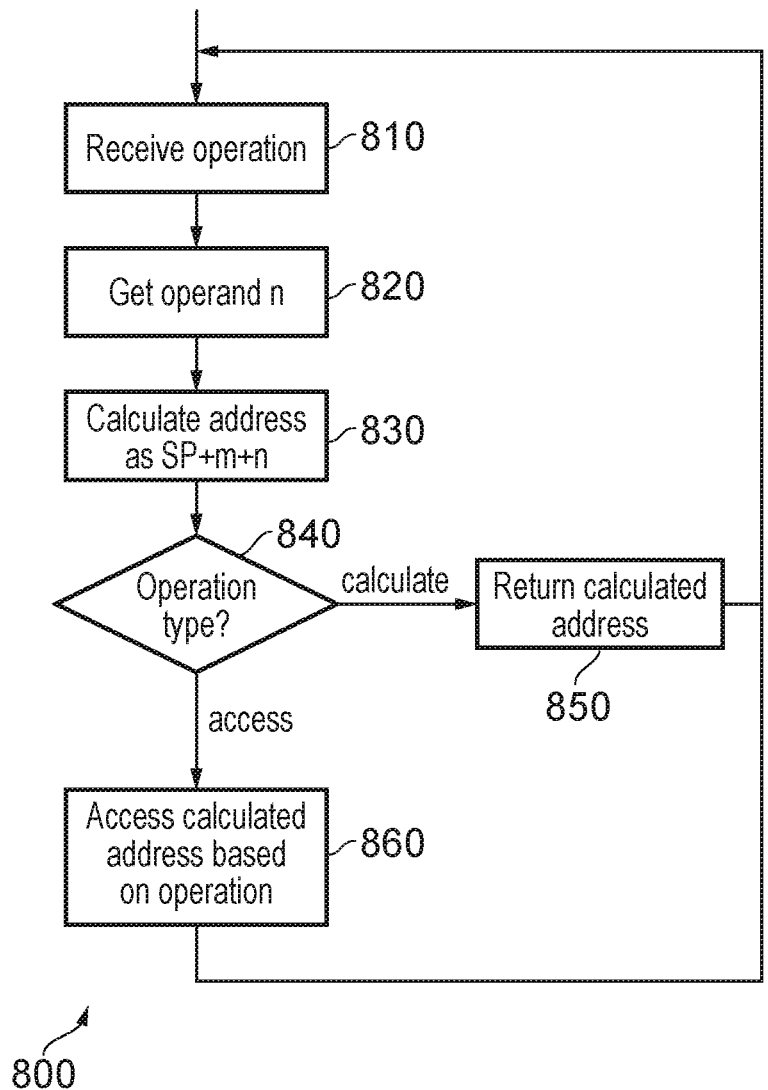
FIG. 8 illustrates a flow chart that shows a process of performing address manipulation in accordance with some embodiments.

FIG. 8 illustrates a flow chart 800 that shows a process of performing address manipulation with respect to arguments that are provided during a function call using the further mode bit storage circuitry 360. At a step 810, an operation is received, at a step 820, an operand (n) of the operation is received that indicates an offset from the data structure to the argument that is desired. At a step 830, an address to be accessed is calculated as the stack pointer (SP) plus m (the number of bytes used by the data structure as indicated by the further mode bits storage circuitry 360) plus n. This assumes that the stack grows downwards in memory (e.g. that the memory addresses decreases as items are added to the stack) however it will be appreciated that a simple variant of the equation can be used in order to be used in a system where the stack addresses grow in the opposite direction (e.g. by swapping the addition operations for subtract operations). Having calculated the address, at step 840, it is determined what the operation type is. If, at step 840, the operation type is to perform a calculation, then the calculated address that was calculated at step 830 is returned at step 850. The process then returns to step 810. However, if the operation type is to perform an access, then at step 860, the access is performed on the calculated address. In the case of a read operation, this will return the data that is stored at the calculated address. In the case of a write operation, the operation will include data or make reference to data that is to be stored at the calculated address. In any event, the process then returns to step 810. In some embodiments the operand (n) may instead be an offset from the stack pointer assuming that all the entries in the data structure are data only, and no metadata is stored. In which case the value (m) (calculated from the category bits in the further mode bits storage circuitry 360) may represent the number of additional bytes in the data structure required due to any metadata and padding.

Figure 9:
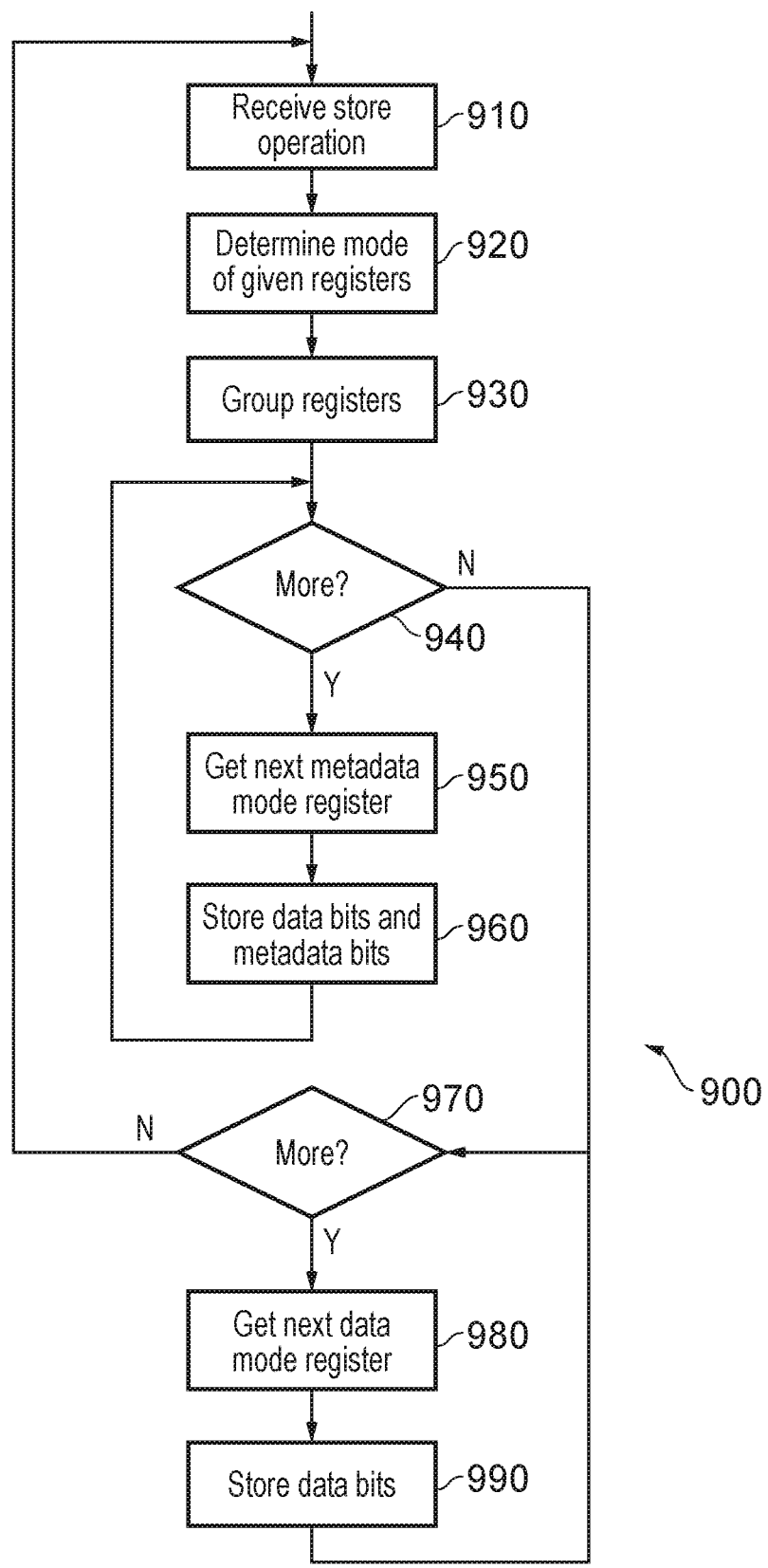
FIG. 9 illustrates a flow chart that shows a process of storing data in accordance with some embodiments.

FIG. 9 illustrates a flow chart 900 that shows a process of storing data to a data structure in accordance with some embodiments. At a step 910, the store operation is received. At a step 920, the mode in which each of the registers 120; 320 to be saved operates in is determined. This can be achieved using the mode bit storage circuitry 130; 330, for instance. At a step 930, the registers are grouped—with the registers that are to be stored that operate in the metadata mode in a first group and the registers that are to be stored that operate in the data mode in a second group. At a step 940, it is determined whether there are more registers in the first (e.g. metadata) group. If so, then at step 950, the next register is selected from this group and at step 960, the data bits and the metadata bits from that register are stored. Otherwise, if there are no more registers in this group at step 940 the process continues to step 970. At step 970, it is determined whether there are more registers in the second (e.g. data) group. If so, then at step 980, the next register is selected from this group and at step 990, the data bits from that register are stored. The process then returns to step 970. Otherwise, if there are no more registers in the second (e.g. data) group then the process returns to step 910.

Figure 10:
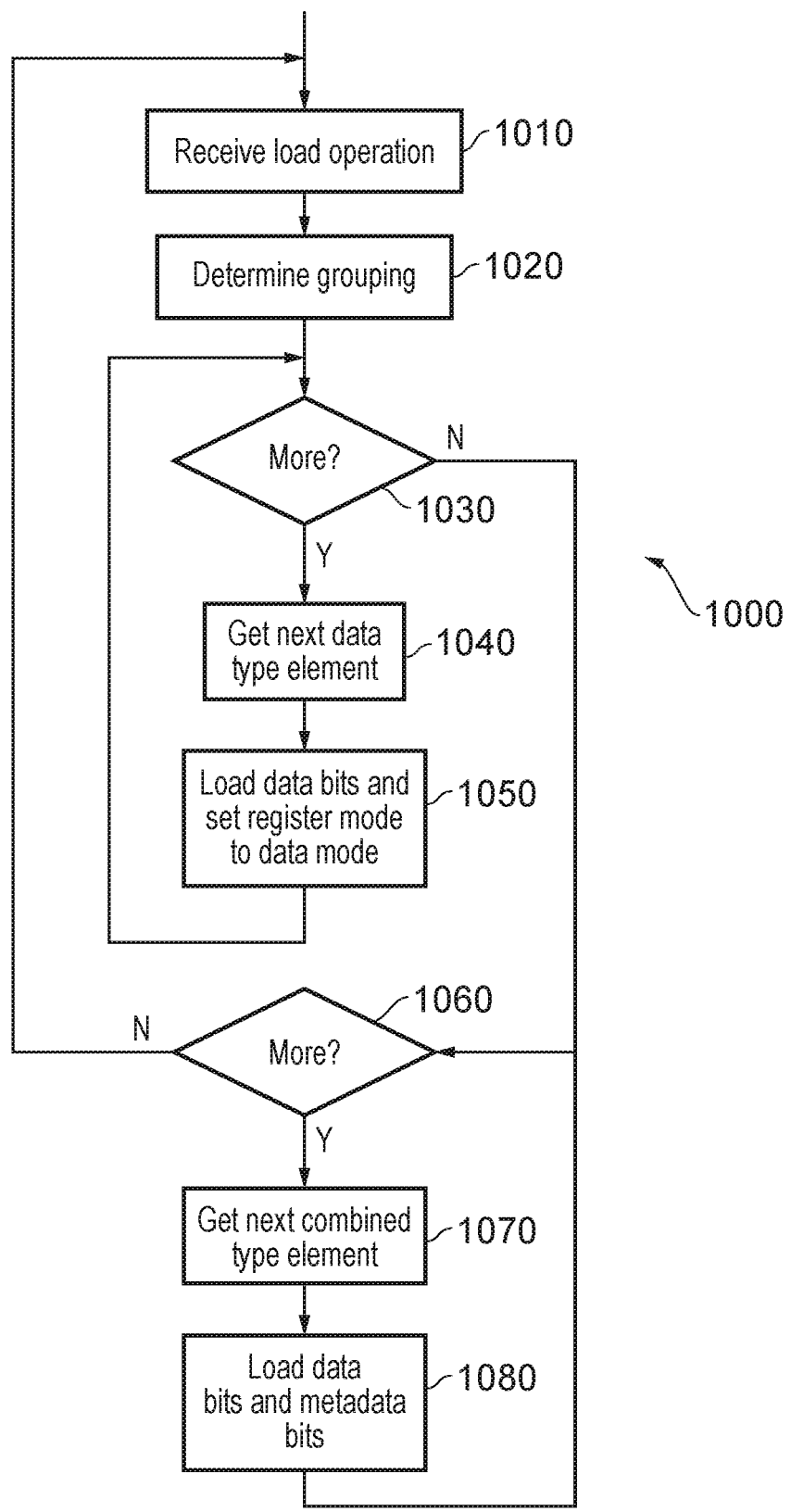
FIG. 10 illustrates a flow chart that provides a method of loading data in accordance with some embodiments.

FIG. 10 illustrates a flow chart 1000 that provides a method of loading data (and possibly metadata) from a data structure in memory to registers where the mode of the register can vary between data mode and metadata mode. At a step 1010, the load operation is received. The data elements in the data structure to be loaded are already grouped together into a first group of elements (having the data type) and a second group of elements (having the combined type—e.g. having both data and metadata). At a step 1020, this grouping is determined. For instance, it might be determined that registers r2 and r4 are stored in the data structure and that these are in the second group, while each of registers r0, r1, and r3 are also stored in the data structure and that these are in the first group. At a step 1030, it is determined whether there are more elements in the first group. If so, then at step 1040, the next element from the first group is obtained. At a step 1050, that element is loaded into the data bits of the relevant register. Furthermore, the mode bit storage circuitry is set to indicate that the register is in the data mode of operation. The process then returns to step 1030. If, at step 1030, there are no more elements in the first group, then the process proceeds to step 1060. At step 1060, it is determined whether here are more elements in the second group. If so, then at step 1070, the next element from the second group (e.g. combined data type) is obtained. Then, at step 1080, the element is loaded into the data bits and the metadata bits of the relevant register. The process then returns to step 1060. If at step 1060, it is determined that there are no further registers in the second group, then the process returns to step 1010.

Figure 11:
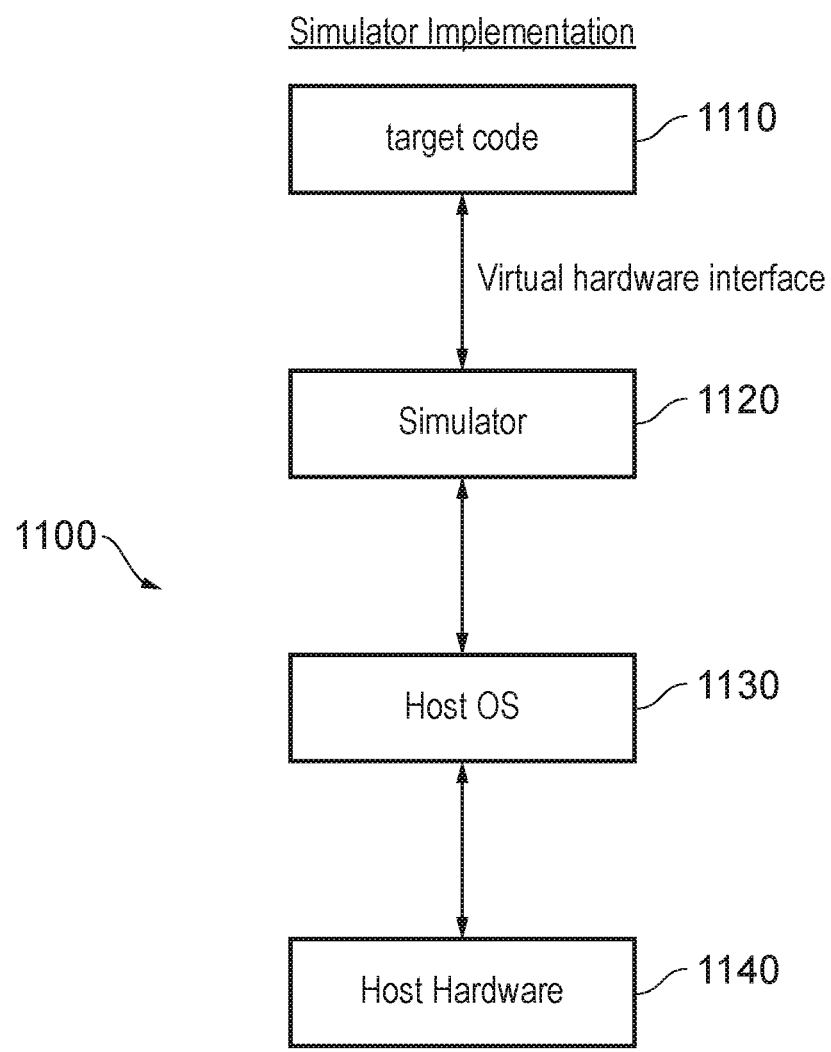
FIG. 11 illustrates a simulator implementation that may be used in accordance with some embodiments.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1140, optionally running a host operating system 1130, supporting the simulator program 1120. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1140), some simulated embodiments may make use of the host hardware, where suitable.

The simulator program 1120 may be stored on a computer-readable storage medium (which may be a non-transitory medium), and provides a program interface (instruction execution environment) to the target code 1110 (which may include some or all of the architecture shown with respect to FIGS. 1 and 3, for instance) which is the same as the interface of the hardware architecture being modelled by the simulator program 1120. Thus, the program instructions of the target code 1110, including the execution circuitry described above, may be executed from within the instruction execution environment using the simulator program 1120, so that a host computer 1140 which does not actually have the hardware features of the apparatus 100; 300 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid;
mode bit storage circuitry adapted to indicate whether each of the registers is in the data mode or the metadata mode; and,
execution circuitry, responsive to a memory operation that is a store operation on one or more given registers:
to determine from the mode bit storage circuitry whether a register in the one or more given registers is in the data mode or the metadata mode;
to store the data bits of the register and the metadata bits of the register to a data structure in memory when the register is in the metadata mode; and,
to store the data bits of the register without the metadata bits of the register to the data structure in the memory when the register is in the data mode.

2. The data processing apparatus according to claim 1, wherein the data bits and the metadata bits of the register that are stored in the data structure in response to the store operation are stored as a contiguous block in the data structure.

3. The data processing apparatus according to claim 2, wherein the data bits and the metadata bits are aligned with a boundary by adding padding bits at the beginning or end.

4. The data processing apparatus according to claim 1, wherein the execution circuitry is further responsive to the store operation to additionally store type bits, comprising a value derived from the mode bit storage circuitry, to the data structure.

5. The data processing apparatus according to claim 1, comprising:
further mode bit storage circuitry to store category bits to indicate which elements in the data structure are of a data type and which of the elements in the data structure are of a combined type; and,
the category bits are derived using the mode bit storage circuitry.

6. The data processing apparatus according to claim 5, wherein the execution circuitry is further responsive to the store operation to additionally store type bits to the data structure, and to update the further mode bit storage circuitry based on current values of the mode bit storage circuitry; and,
the type bits are derived from the category bits stored in the further mode bit storage circuitry.

7. A data processing apparatus comprising:
a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid;
mode bit storage circuitry adapted to indicate whether each of the registers is in the data mode or the metadata mode; and,
execution circuitry, responsive to a memory operation that is a load operation on one or more given elements of a data structure in a memory:
to determine whether an element in the one or more given elements is of a data type or a combined type;
to load the element into the data bits of one of the registers and to set the mode bit storage circuitry to indicate that the one of the registers is in the data mode when the element is of the data type; and,
to load the element into the data bits and the metadata bits of one of the registers when the element is of the combined type.

8. The data processing apparatus according to claim 7, wherein the execution circuitry is adapted to determine whether the element in the one or more given elements is of the data type or the combined type by referring to at least part of the data structure.

9. The data processing apparatus according to claim 8, wherein the execution circuitry is configured to load the element into the one of the registers by: loading the data from the element into the data bits of one of the registers without loading into the metadata bits of the one of the registers, when the element is of the data type; and, loading the data and the metadata from the element into the one of the registers when the element is of the combined type.

10. The data processing apparatus according to claim 7, comprising:
further mode bit storage circuitry to store category bits to indicate which of the elements in the data structure are of the data type and which of the elements in the data structure are of the combined type;
the execution circuitry is adapted to determine whether the element in the one or more given elements is of the data type or the combined type by referring to the further mode bit storage circuitry; and,
in response to the load operation the execution circuitry is configured to set the further mode bit storage circuitry to a value derived from at least part of the data structure.

11. A data processing system comprising:
a first data processing apparatus according to claim 1; and
a second data processing apparatus comprising a plurality of registers, each of the registers having data bits to store data, and metadata bits to store metadata, wherein each of the registers is adapted to operate in a metadata mode in which the metadata bits and the data bits are valid, and a data mode in which the data bits are valid and the metadata bits are invalid;
mode bit storage circuitry adapted to indicate whether each of the registers is in the data mode or the metadata mode; and,
execution circuitry, responsive to a memory operation that is a load operation on one or more given elements of a data structure in a memory:
to determine whether an element in the one or more given elements is of a data type or a combined type;
to load the element into the data bits of one of the registers and to set the mode bit storage circuitry to indicate that the one of the registers is in the data mode when the element is of the data type; and,
to load the element into the data bits and the metadata bits of one of the registers when the element is of the combined type.

12. The data processing apparatus according to claim 5, comprising:
further execution circuitry, responsive to a further operation to calculate and return an address of a further data value in the memory in dependence on the category bits and an operand of the further operation.

13. The data processing apparatus according to claim 5, comprising:
further execution circuitry, responsive to a further operation to calculate and access an address of a further data value in the memory in dependence on the category bits and an operand of the further operation.

14. The data processing apparatus according to claim 1, wherein when the mode bit storage circuitry indicates a particular register of the plurality of registers is in the metadata mode, the data of the particular register comprises a pointer and the metadata of the particular register comprises bounds information to constrain a range of addresses the pointer can be used to access, and access information to constrain operations performed in dependence on the pointer, the access information comprising at least one of:
read permission information indicative of whether the pointer can be used to read a memory address;
write permission information indicative of whether the pointer can be used to write to a memory address;
branch permission information indicative of whether the pointer can be used to perform a branch operation to a memory address; and,
execution permission information indicative of whether instructions within the range of addresses can be executed.

15. The data processing apparatus according to claim 1, wherein the data structure is a stack frame.

16. The data processing apparatus according to claim 1, wherein in response to the memory operation, the execution circuitry is adapted to access the data structure in the memory such that the data bits of those of the one or more given registers that are in the data mode are contiguous within the data structure, and the data bits and the metadata bits of those of the one or more given registers that are in the metadata mode are contiguous within the data structure.

17. A data processing method, comprising:
indicating whether each of a plurality of registers is in a data mode or a metadata mode, wherein each of the registers has data bits to store data, and metadata bits to store metadata, and wherein when one of the registers operates in the metadata mode, the metadata bits and the data bits are valid, and when the one of the registers operates in the data mode, the data bits are valid and the metadata bits are invalid;
responding to a memory operation that is a store operation by:
determining from mode bit storage circuitry whether a register in the one or more given registers is in the data mode or the metadata mode;
storing the data bits of the register and the metadata bits of the register to a data structure in memory when the register is in the metadata mode; and,
storing the data bits of the register without the metadata bits of the register to the data structure in the memory when the register is in the data mode.

18. A data processing method, comprising:
indicating, using mode bit storage circuitry, whether each of a plurality of registers is in a data mode or a metadata mode, wherein each of the registers has data bits to store data, and metadata bits to store metadata, and wherein when one of the registers operates in the metadata mode, the metadata bits and the data bits are valid, and when the one of the registers operates in the data mode, the data bits are valid and the metadata bits are invalid;
responding to a memory operation that is a load operation by:
determining whether an element in the one or more given elements is of a data type or a combined type;
loading the element into the data bits of one of the registers and setting the mode bit storage circuitry to indicate that the one of the registers is in the data mode when the element is of the data type; and,
loading the element into the data bits and the metadata bits of one of the registers when the element is of the combined type.

19. A non-transitory storage medium storing a computer program for controlling a host data processing apparatus to provide an instruction execution environment comprising:
a plurality of register data structures, each of the register data structures having data bit data structures to store data, and metadata data structures to store metadata, wherein each of the register data structures is adapted to operate in a metadata mode in which the metadata bit data structures and the data bit data structures are valid, and a data mode in which the data bit data structures are valid and the metadata bit data structures are invalid;

a mode bit data structure adapted to indicate whether each of the register data structures is in the data mode or the metadata mode; and, execution program logic, responsive to a memory operation that is a store operation on one or more given register data structures:
- to determine from the mode bit data structure whether a register data structure in the one or more given register data structures is in the data mode or the metadata mode;
- to store the data bit data structures of the register data structure and the metadata bit data structures of the register data structures to a memory data structure when the register data structure is in the metadata mode; and,
- to store the data bit data structures of the register data structure without the metadata bit data structures of the register data structures to the memory data structure when the register is in the data mode.

20. A non-transitory storage medium storing a computer program for controlling a host data processing apparatus to provide an instruction execution environment comprising:

a plurality of register data structures, each of the register data structures having data bit data structures to store data, and metadata data structures to store metadata, wherein each of the register data structures is adapted to operate in a metadata mode in which the metadata bit data structures and the data bit data structures are valid, and a data mode in which the data bit data structures are valid and the metadata bit data structures are invalid;

a mode bit data structure adapted to indicate whether each of the register data structures is in the data mode or the metadata mode; and, execution program logic, responsive to a memory operation that is a load operation on one or more given elements of a memory data structure:
- to determine whether an element in the one or more given elements is of a data type or a combined type;
- to load the element into the data bit data structures of one of the register data structures and to set the mode bit storage data structure to indicate that the one of the register data structures is in the data mode when the element is of the data type; and,
- to load the element into the data bit data structures and the metadata bit data structures of one of the register data structures when the element is of the combined type.

* * * * *